United States Patent [19]

Takagi et al.

[11] Patent Number: 4,597,958
[45] Date of Patent: Jul. 1, 1986

[54] METHOD OF PRODUCING HYDRATED IRON OXIDE

[75] Inventors: Nobuo Takagi, Tokyo; Masakazu Konno; Takeo Kobayashi, both of Saitama, all of Japan

[73] Assignee: Mitsui Mining & Smelting Co., Ltd., Tokyo, Japan

[21] Appl. No.: 651,222

[22] Filed: Sep. 17, 1984

[51] Int. Cl.$^4$ .............................................. C01G 49/02
[52] U.S. Cl. ..................................... 423/633; 423/632
[58] Field of Search ................................ 423/632–634

[56] References Cited

U.S. PATENT DOCUMENTS 4,251,504 2/1981 Hamabata et al. ................... 423/632

FOREIGN PATENT DOCUMENTS 54-130499 10/1979 Japan .
54-138896 10/1979 Japan .................................. 423/634

Primary Examiner—Jack Cooper
Attorney, Agent, or Firm—Thomas H. Whaley

[57] ABSTRACT

In a method of producing a hydrated iron oxide as a starting material for a magnetic powder by aging a suspension of a ferric hydroxide prepared by reacting a ferric salt with an aqueous solution of alkali, the aging temperature is controlled between 20° and 100° C. and pH is controlled between 1 and 6 for the first 5 to 240 minutes while nuclei of hydrated iron oxide crystals generate, and then the aqueous solution of alkali is added again to adjust the pH value to 10 to 13.5 to make the crystals grow. This production method is capable of producing an acicular hydrated iron oxide having a reduced particle-size distribution range and also capable of controlling the length of the crystals as desired.

9 Claims, 3 Drawing Figures

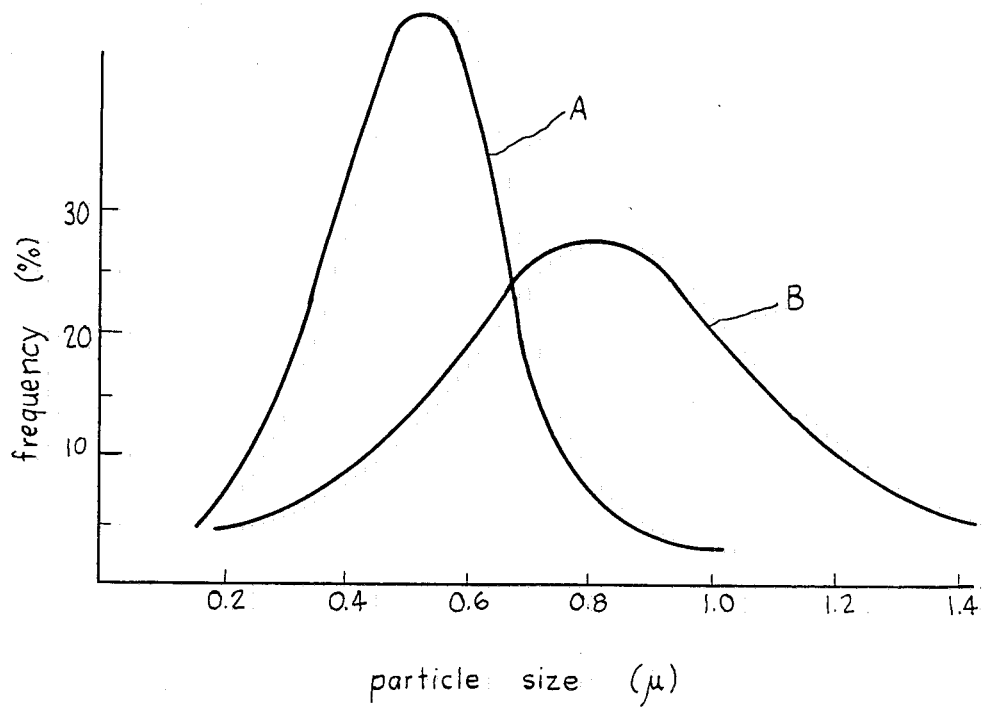

METHOD OF PRODUCING HYDRATED IRON OXIDE

BACKGROUND OF THE INVENTION

The present invention relates to a method of producing hydrated iron oxide which is well suited for use as a starting material for producing an acicular or needle-like magnetic iron oxide powder or acicular ferromagnetic metal powder used for magnetic recording media.

Generally, an acicular magnetic iron oxide powder or acicular ferromagnetic metal powder for magnetic recording media is produced by heating and reducing a hydrated oxide of iron ($Fe_2O_3 \cdot H_2O$) by hydrogen.

Since the particle shape of such magnetic iron oxide powder or ferromagnetic metal powder is much dependent on the shape of a starting material, i.e., a hydrated oxide of iron ($\alpha$-FeOOH, $\beta$-FeOOH or $\gamma$-FeOOH), the shape of a hydrated iron oxide used as a raw material is very important.

In the past, a hydrated iron oxide production method has been used widely in which a hydrated iron oxide is produced through the reaction of a ferrous salt solution with an alkali and an oxygen-containing gas.

While this method is advantageous in that the acicular form (the length-to-width ratio) of the produced hydrated iron oxide is excellent and that the particle size of the hydrated iron oxide can be controlled relatively easily, it is also disadvantageous in that branching tends to occur easily and that the range of a particle-size distribution is wide. On the other hand, a method has been proposed in which a hydrated iron oxide is produced by ageing a suspension of ferric hydroxide obtained by neutralizing a ferric salt with an aqueous solution of alkali. While the hydrated iron oxide of this method has the advantage of eliminating the branching, there are disadvantages that it is difficult to control the particle size and particularly it is difficult to obtain the fine particle and that the range of a particle-size distribution is wide.

SUMMARY OF THE INVENTION

It is an object of the present invention to provide a method of producing a fine-particle hydrated iron oxide which is free from the above described deficiencies of the conventional methods that is, free from branching, sharp in size distribution, and easy to control the particle size.

It is another object of the invention to provide a hydrated iron oxide which is well suited for use as a starting material for the production of an acicular magnetic iron oxide powder or an acicular ferromagnetic metal powder for magnetic recording media.

With a view to accomplishing the above objects of the invention, the inventors have completed the present invention by producing hydrated oxides of iron from salts of iron under varying production conditions and crystal growing conditions and observing and studying the produced hydrated iron oxide particles by an electron microscope.

In accordance with the present invention, there is thus provided a method of producing a hydrated iron oxide comprising the method of producing a hydrated iron oxide useful as a starting material for a magnetic powder by maturing a suspension including a ferric hydroxide obtained by reacting a ferric salt with an aqueous solution of alkali, characterized by effecting the reaction under conditions of a pH value of 1 to 6, a reaction temperature of 20° to 100° C. and a reaction time of 5 to 240 minutes to generate crystal nuclei of a hydrated iron oxide and further adding the alkali to adjust the pH to 10 to 13.5 and thereby cause the growth of the crystals.

The method of this invention is capable of producing an acicular hydrated iron oxide having a reduced particle-size distribution range and no occurrence of branching by controlling the length of the macroaxis of its crystals as desired.

BRIEF DESCRIPTION OF THE DRAWINGS

FIG. 3 is a graph showing by curves A and B the distribution of particle sizes (the lengths of crystal macroaxes) of hydrated iron oxides produced by the method of the example 1 of the invention and the method of a comparative example 3.

DESCRIPTION OF THE PREFERRED EMBODIMENTS

Figure 1:
FIG. 1 is an electromicrograph of 30,000 magnifications showing a test No. 2 product in an example 1.

In accordance with a hydrated iron oxide production a method of this invention, the generation of crystal nuclei of the hydrated iron oxide is carried out in a solution having a high acidity, wherein the growth of the crystals is very slow so that the growth of individual crystal nucleus does not practically take place, although the number of crystal nuclei generated increases with the passage of time. Also, the number of the crystal nuclei is increased with an increase in the temperature. It has now been found that if, after the generation of crystal nuclei for 5 to 240 minutes in an acid solution, an alkali is added to the solution to adjust the pH value to 10 or over, no new crystal nuclei are generated and only the growth the existing crystal nuclei takes place.

From the foregoing it will be seen that in order to produce a hydrated iron oxide of relatively large particle size, it is only necessary that the temperature and time of a crystal nucleus generating period be decreased so that the number of crystal nuclei generated is limited, after which an aqueous solution of alkali is added to cause the crystal growth. Also, in order to produce a hydrated iron oxide of relatively small particle size, it is only necessary that the temperature and time of a crystal nucleus generating period are increased and after the number of crystal nuclei generated is large enough, an aqueous solution of alkali is added to cause the crystal growth.

During the crystal nucleus generating stage of a hydrated iron oxide, the rate at which hydrated iron oxide is dissolved is greater than that of its generation when the pH value is less than 1, and when the pH value is more than 6, the ferric hydroxide is stabilized thus making the production of the hydrated iron oxide difficult. In either of the two cases, the generation of the crystal nuclei in a sufficient amount is impossible and thus the required pH value is in the range of 1 to 6, preferably in the range of 2.5 to 4.0. On the other hand, if the temperature of the crystal nucleus generating stage is under 20° C., the rate of generation of the cyrstal nuclei is slow and the generation of the crystal nuclei is insufficient. Thus, there is a disadvantage that when the solution is made alkaline, new crystal nuclei are still generated and are caused to grow abnormally thus causing existence of abnormally large crystals. Also, if the temperature exceeds 100° C., while uniform crystal nuclei can still be obtained, the growth of the crystal nuclei is very fast and the number of the crystal nuclei becomes excessively large relative to the total amount of the iron. Thus, the length of the crystals obtained is 0.1 μ or less which is too small for use as a starting material for magnetic powder.

If the pH value of the solution is less than 10 at the crystal growth stage, the ferric hydroxide is comparatively stable so that the growth of the hydrated iron oxide is slow and the crystallizability is deteriorated even if it grows. On the other hand, if the pH value exceeds 13.5, a particulate $\alpha.Fe_2O_3$ is produced and the product becomes unsuitable as a starting material for magnetic powder. Therefore, the required pH value is between 10 and 13.5 and preferably between 11 and 13. Also, in this case, while there is no limitation to the temperature condition and the same temperature as used at the crystal nucleus generating stage may be used, the use of an increased temperature is commercially advantageous in that the rate of growth is fast and the required time up to the completion of ageing is reduced.

Ferric sulfate, ferric chloride ferric nitrate, etc., can be used as the ferric salt. Ferric sulfate obtained by oxidizing a ferrous sulfate with a suitable oxidizing agent such as hydrogen peroxide may also be used. As regards the alkali, an aqueous solution of caustic alkali, such as sodium hydroxide or potassium hydroxide is usually used and any other solution such as an aqueous solution of sodium carbonate, sodium bicarbonate or ammonium carbonate may also be used.

It is to be noted that in accordance with the present invention the term particle size or particle diameter denotes the length of crystals.

The present invention will now be described in greater detail by way of the following examples and comparative examples.

EXAMPLE 1

An aqueous solution of sodium hydroxide was added to 500 ml of an aqueous solution of ferric sulfate of 0.50 mol/l and the pH value was adjusted to 2.9. Then, water was added to adjust the volume to 1l, and stirred at 80° C. for different reaction periods, i.e., 30 minutes (test No. 1), 1 hour (test No. 2), 2 hours (test No. 3) and 4 hours (test No. 4), respectively, after which the pH value was adjusted to 12.3 by further addition of the sodium hydroxide solution and aged for 4 hours thus performing the tests No. 1 to 4 and producing hydrated iron oxides α-FeOOH. Table 1 shows these test conditions and the average length of the crystals obtained by observing the produced hydrated iron oxides (α-FeOOH) by an electron microscope. Also, FIG. 1 shows a 30,000-magnification electromicrograph of the test No. 2 and FIG. 2 shows a 63,000-magnification electro micrograph of the test No. 4.

Figure 2:
FIG. 2 is an electromicrograph 63,000 magnifications showing a test No. 4 product in an example 2.

As shown by the results of Table 1 and FIGS. 1 and 2, the average crystal particle diameters of the hydrated iron oxides were between 0.1 and 0.5 μ and the average particle diameter was controllable by varying the crystal nucleus generating time so as to produce a hydrated iron oxide free from branching and having a reduced particle-size distribution range of from 0.05 to 1μ as in the case of the curve A in FIG. 3.

EXAMPLE 2

500 ml of an aqueous solution of ferrous sulfate of 0.5 mol/l was oxidized by addition of 17.5 ml of 35% hydrogen peroxide solution and then the pH was adjusted to 3.5 by addition of an aqueous solution of sodium hydroxide. After 1 l of such test liquid had been stirred at 60° C. for 2 hours, the pH value was adjusted to 12.4 by addition of the aqueous solution of sodium hydroxide, the temperature was raised to 60° C. and the stirring was continued for 4 hours. The resulting hydrated iron oxide (α-FeOOH) showed an average particle diameter of 0.25 μ and a reduced particle-size distribution as shown in Table 1.

EXAMPLE 3

An aqueous solution of sodium hydroxide was added to 500 ml of an aqueous solution of ferric chloride of 0.5 mol/l to adjust the pH value to 3.1. Then 1 l of such test liquid was stirred for 30 minutes at a raised temperature of 90° C. and then the pH value was readjusted to 11.8 by adding the aqueous solution of sodium hydroxide after which the stirring was continued for 4 hours. The resulting hydrated iron oxide (β-FeOOH) showed an average particle diameter of 0.35 μ and a reduced partile-size distribution as shown in Table 1.

Comparative example 1

Under the same conditions as the test No. 3 of the Example 1 except that the pH value during the crystal formation period was 7.0 instead of 2.9 the reaction was effected and the crystals were aged failing to produce any acicular hydrated iron oxide.

Comparative example 2

An aqueous solution of sodium hydroxide was added to 500 ml of an aqueous solution of ferric sulfate of 0.5 mol/l to adjust the pH value to 12.3. 1 l of such test liquid was stirred at 80° C. for 5 hours and the resulting hydrated iron oxide α-FeOOH showed a crystal length distribution of 1 to 3 μ showing that an excessively long ageing time would deteriorate the crystallizability.

Comparative example 3

500 ml of an aqueous solution of ferrous sulfate of 0.5 mol/l was oxidized by addition of 17.5 ml of 35% hydrogen peroxide solution and then the pH value was adjusted to 12.3 by addition of an aqueous solution of sodium hydroxide. 1 l of such test liquid was stirred at 20° C. for 24 hours after which the temperature was raised to 80° C. and the stirring was continued for 8 hours. As shown in Table 1, the resulting hydrated iron oxide (β-FeOOH) showed an average particle length of 0.8 μ and a particle-size distribution wider than that of the Example 1 of the method according to the invention as shown by the curve B in FIG. 3.

The test conditions and the average particle length of the resulting hydrated iron oxides (β-FeOOH) are shown in Table 1 and the particle-size distributions of the hydrated iron oxides produced by the test No. 1 of the Example 1 and the comparative example 3 are shown in FIG. 3.

TABLE 1

| | Test No. | Nucleus generating period pH | Nucleus generation time | Nucleus generating period temperature °C. | Growing period pH | Growing period temperature °C. | Average particle length μ |
|---|---|---|---|---|---|---|---|
| Example 1 | 1 | 2.9 | 30 min | 80 | 12.3 | 80 | 0.5 |
| | 2 | 2.9 | 1 hour | 80 | 12.3 | 80 | 0.35 |
| | 3 | 2.9 | 2 hours | 80 | 12.3 | 80 | 0.2 |
| | 4 | 2.9 | 4 hours | 80 | 12.3 | 80 | 0.1 |
| Example 2 | 5 | 3.5 | 2 hours | 60 | 12.4 | 80 | 0.25 |
| Example 3 | 6 | 3.1 | 30 min | 90 | 11.8 | 90 | 0.35 |
| Comparative example 1 | 7 | 7.0 | 2 hours | 80 | 12.3 | 80 | — |
| Comparative example 2 | 8 | 12.3 | — | 80 | 12.3 | 80 | 2.0 |
| Comparative example 3 | 9 | 12.3 | 24 hours | 20 | 12.3 | 80 | 0.8 |

As described hereinabove, a hydrated iron oxide produced according to the invention is well suited for use as a starting material for the production of an acicular magnetic iron oxide powder or an acicular ferromagnetic metal powder for magnetic recording media.

What is claimed is:

1. A method for the production of acicular iron oxide hydroxide which comprises:
   (a) forming an aqueous solution having a pH in the range of 2.5 to 4 from a ferric salt and an alkali by adding an aqueous solution of the alkali to an aqueous solution of the ferric salt;
   (b) maintaining said solution at said pH under conditions of continouos agitation at a temperature in the range of 20° to 100° C. for a period of time in the range of 5 to 240 minutes to effect formation of a suspension of nuclei crystals of an iron oxide hydroxide;
   (c) thereafter adjusting the pH of the suspension to a value within the range of 10 to 13.5 by the addition of an alkali and aging the suspension for a period of about four hours at a temperature in the range of 20° to 100° C. to effect the growth of acicular crystals of iron oxide hydroxide.

2. A method according to claim 1 wherein the pH of the aqueous solution in step (a) is about 2.9.

3. A method according to claim 1 wherein the pH of the crystal growth suspension in step (c) is in the range of 11 to 13.

4. A method according to claim 1, wherein said ferric salt is selected from the group consisting of a ferric sulfate, ferric chloride and ferric nitrate.

5. A method according to claim 1, wherein said iron oxide hydroxide is an $\alpha$-FeOOH or $\beta$-FeOOH.

6. A method according to claim 1 wherein said ferric salt is prepared by oxidizing a ferrous salt by hydrogen peroxide.

7. A method according to claim 1, wherein said alkali is selected from the group consisting of sodium hydroxide, potassium hydroxide, sodium carbonate, sodium bicarbonate and ammonium carbonate.

8. A method according to claim 1 wherein said iron oxide hydroxide has an average particle size between 0.1 and 0.5 $\mu$.

9. A method according to claim 1 wherein said iron oxide hydroxide has a particle-size distribution ranging from 0.05 to 1 $\mu$.

* * * * *

UNITED STATES PATENT AND TRADEMARK OFFICE
CERTIFICATE OF CORRECTION

PATENT NO. : 4,597,958

DATED : July 1, 1986

INVENTOR(S) : Nobuo Takagi, Masakazu Konno and Takeo Kobayashi

It is certified that error appears in the above-identified patent and that said Letters Patent is hereby corrected as shown below:

Col. 4, line 59, "$\beta$-FeOOH" should be --$\alpha$-FeOOH--;

line 64, "$\beta$-FeOOH" should be --$\alpha$-FeOOH--.

Signed and Sealed this

Twenty-eighth Day of October, 1986

[SEAL]

Attest:

DONALD J. QUIGG

Attesting Officer     Commissioner of Patents and Trademarks